United States Patent
Cuddihy et al.

(10) Patent No.: US 9,073,574 B2
(45) Date of Patent: Jul. 7, 2015

(54) AUTONOMOUS VEHICLE WITH RECONFIGURABLE INTERIOR

(71) Applicant: Ford Global Technologies, LLC, Dearborn, MI (US)

(72) Inventors: Mark A. Cuddihy, New Boston, MI (US); Christopher Attard, Ann Arbor, MI (US); Jeff Allen Greenberg, Ann Arbor, MI (US); Rajit Johri, Ann Arbor, MI (US); Devinder Singh Kochhar, Ann Arbor, MI (US); Jialiang Le, Canton, MI (US); Manoharprasad K. Rao, Novi, MI (US); Matthew Y. Rupp, Canton, MI (US); John Shutko, Ann Arbor, MI (US); Roger Arnold Trombley, Ann Arbor, MI (US); Hongtei Eric Tseng, Canton, MI (US); Andrew Waldis, Orion Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/220,452

(22) Filed: Mar. 20, 2014

(65) Prior Publication Data

US 2015/0142246 A1    May 21, 2015

Related U.S. Application Data (63) Continuation-in-part of application No. 14/085,135, filed on Nov. 20, 2013, and a continuation-in-part of application No. 14/085,158, filed on Nov. 20, 2013, and a continuation-in-part of application No. 14/085,166, filed on Nov. 20, 2013.

(51) Int. Cl.
*B60R 21/00* (2006.01)
*B62D 1/183* (2006.01)
*G05D 1/00* (2006.01)
(Continued)

(52) U.S. Cl.
CPC .............. *B62D 1/183* (2013.01); *G05D 1/0088* (2013.01); *B60R 21/23* (2013.01); *B60R 21/203* (2013.01); *B60R 21/214* (2013.01); *B60R 21/01* (2013.01); *B60R 2021/0273* (2013.01); *B60R 2021/01293* (2013.01)

(58) Field of Classification Search
None
See application file for complete search history.

(56) References Cited

U.S. PATENT DOCUMENTS

| 4,653,809 | A |   | 3/1987 | Czernakowski et al. |
| 6,024,647 | A | * | 2/2000 | Bennett et al. ................... 472/43 |

(Continued)

FOREIGN PATENT DOCUMENTS

JP       2005225296       8/2005

OTHER PUBLICATIONS

William Diem, "Camera Technology Monitors Where Driver is Looking", WARDSAUTO, Aug. 5, 2013; 2013 C AR Management Briefing Seminars, 3 pages.

*Primary Examiner* — Jonathan M Dager
(74) *Attorney, Agent, or Firm* — Frank MacKenzie; Bejin Bieneman PLC (57) ABSTRACT

A vehicle includes a steering wheel located in a passenger compartment. The steering wheel is configured to be moved from an operational position to a stowed position. In the event of a collision, a first airbag is configured to deploy when the steering wheel is in the operational position and a second airbag is configured to deploy when the steering wheel is in the stowed position.

20 Claims, 6 Drawing Sheets

(51) Int. Cl.
  *B60R 21/23* (2006.01)
  *B60R 21/203* (2006.01)
  *B60R 21/214* (2011.01)
  *B60R 21/01* (2006.01)
  *B60R 21/02* (2006.01)

(56) References Cited

U.S. PATENT DOCUMENTS

| | | | | |
|---|---|---|---|---|
| 6,240,352 | B1 * | 5/2001 | McCurdy | 701/45 |
| 6,457,694 | B1 * | 10/2002 | Haynes et al. | 248/415 |
| 6,488,333 | B2 * | 12/2002 | Kim | 297/94 |
| 6,494,531 | B1 * | 12/2002 | Kim | 297/94 |
| 6,782,831 | B2 * | 8/2004 | Yamada | 104/53 |
| 6,991,285 | B1 * | 1/2006 | Hemenway | 297/94 |
| 7,281,761 | B2 * | 10/2007 | Brown et al. | 297/95 |
| 7,775,599 | B2 * | 8/2010 | George et al. | 297/383 |
| 8,534,735 | B2 * | 9/2013 | McManus et al. | 296/26.08 |
| 2003/0047974 | A1 * | 3/2003 | Tame | 297/283.3 |
| 2004/0262940 | A1 * | 12/2004 | Johnson | 296/64 |
| 2005/0038575 | A1 * | 2/2005 | Wu | 701/19 |
| 2006/0042497 | A1 * | 3/2006 | Yamada | 104/18 |
| 2007/0198145 | A1 * | 8/2007 | Norris et al. | 701/23 |
| 2011/0071718 | A1 * | 3/2011 | Norris et al. | 701/23 |
| 2013/0002416 | A1 * | 1/2013 | Gazit | 340/438 |
| 2013/0006478 | A1 * | 1/2013 | Lin | 701/49 |
| 2014/0207535 | A1 * | 7/2014 | Stefan et al. | 705/7.42 |
| 2014/0260761 | A1 * | 9/2014 | Soderlind | 74/493 |
| 2014/0277896 | A1 * | 9/2014 | Lathrop et al. | 701/23 |

* cited by examiner

Fig-9

AUTONOMOUS VEHICLE WITH RECONFIGURABLE INTERIOR

CROSS-REFERENCE TO RELATED APPLICATIONS

This application is a continuation-in-part of U.S. Ser. No. 14/085,135 filed on Nov. 20, 2013, U.S. Ser. No. 14/085,158 filed on Nov. 20, 2103, and U.S. Ser. No. 14/085,166 filed on Nov. 20, 2013, each titled "AUTONOMOUS VEHICLE WITH RECONFIGURABLE SEATS", the contents of which are hereby incorporated by reference in their entireties.

BACKGROUND

Autonomous vehicles are becoming more sophisticated. As the level of sophistication increases, the amount of passenger interaction required by the autonomous vehicle decreases. Eventually, autonomous vehicles may require no passenger interaction beyond, e.g., selecting a destination, leaving passengers to focus on non-driving-related tasks.

SUMMARY

A steering wheel located in a passenger compartment of a vehicle may be moved from an operational position to a stowed position. A first airbag may be deployed during a collision if the steering wheel is in the operational position. A second airbag may be deployed during the collision if the steering wheel is in the stowed position.

The first airbag may be integrated into the steering wheel. The second airbag may be incorporated into a header.

A processing device may selectively enable the first airbag or the second airbag based on whether the steering wheel is in the operational position or the stowed position, and whether the driver seat is facing a vehicle forward direction. The processing device may disable the first the first airbag and the second airbag when a driver seat is facing backward and the vehicle is operating in an autonomous mode.

The steering wheel may be stowed under an instrument panel when the steering wheel is in the stowed position. The first airbag may be disabled while the steering wheel is in the stowed position. The second airbag may be disabled while the steering wheel is in the operational position. The steering wheel may be moved to the stowed position when the vehicle is operating in an autonomous mode and from the stowed position to the operational position prior to the vehicle operating in a non-autonomous mode.

In another possible implementation, an example vehicle includes autonomous driving sensors and an autonomous controller configured to receive signals generated by the autonomous driving sensors. The autonomous mode controller can control at least one vehicle subsystems according to the signals. A steering wheel may be located in the passenger compartment and may be moved from an operational position to a stowed position. A first airbag may deploy during a collision if the steering wheel is in the operational position. A second airbag may deploy during the collision if the steering wheel is in the stowed position.

The first airbag may be integrated into the steering wheel. The second airbag may be incorporated into a header.

A processing device may be incorporated into the autonomous mode controller. The processing device may selectively enable the first airbag or the second airbag based on whether the steering wheel is in the operational position or the stowed position, and whether the driver seat is facing a vehicle forward direction. The processing device may disable the first airbag and the second airbag when a driver seat is facing backward and the vehicle is operating in an autonomous mode.

The steering wheel may be stowed under an instrument panel when the steering wheel is in the stowed position. The first airbag may be disabled while the steering wheel is in the stowed position. The second airbag may be disabled while the steering wheel is in the operational position. The steering wheel may be moved to the stowed position when the vehicle is operating in an autonomous mode and from the stowed position to the operational position prior to the vehicle operating in a non-autonomous mode.

In another possible approach, a vehicle may include autonomous driving sensors and an autonomous controller that may receive signals generated by the autonomous driving sensors. The autonomous mode controller may control at least one vehicle subsystem according to the signals. A steering wheel may be located in the passenger compartment and configured to be moved from an operational position to a stowed position. A first airbag may be incorporated into the steering wheel and configured to deploy during a collision if the steering wheel is in the operational position. A second airbag may be incorporated into a header and configured to deploy during the collision if the steering wheel is in the stowed position. A processing device may be configured to selectively enable one of the first airbag and the second airbag based on whether the steering wheel is in one of the operational position and the stowed position.

DETAILED DESCRIPTION

An exemplary autonomous vehicle includes a steering wheel located in a passenger compartment. The steering wheel is configured to be moved from an operational position to a stowed position. In the event of a collision, a first airbag is configured to deploy when the steering wheel is in the operational position and a second airbag is configured to deploy when the steering wheel is in the stowed position. The vehicle may further include autonomous driving sensors and an autonomous controller that receives signals generated by the autonomous driving sensors (e.g., sensors for driving the vehicle in an autonomous mode) and controls at least one vehicle subsystem to operate the vehicle in autonomous mode according to the signals received.

The FIGS. illustrate exemplary views of an autonomous vehicle 100 with reconfigurable interior. The vehicle may take many different forms and include multiple and/or alternate components and facilities. While an exemplary vehicle is shown, the exemplary components illustrated are not intended to be limiting. Indeed, additional or alternative components and/or implementations may be used. Moreover, the components shown in the FIGS. are not necessarily drawn to scale.

Figure 1:
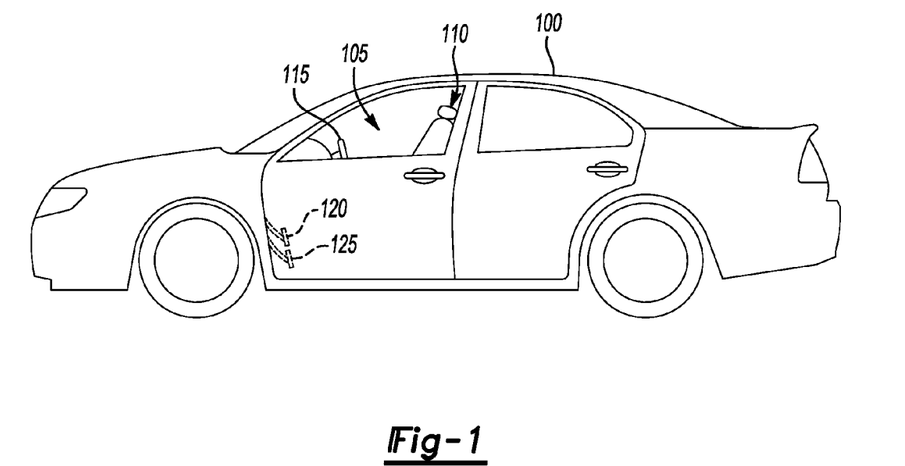
FIG. 1 illustrates an exemplary autonomous vehicle with reconfigurable interior.

As illustrated in FIG. 1, the vehicle 100 includes a passenger compartment 105 located in an interior of the vehicle 100. The passenger compartment 105 may include any part of the vehicle 100 where passengers may sit while the vehicle 100 is operating. In addition, the passenger compartment 105 may include seats 110 and controls that allow a driver to control operation of the vehicle 100. Examples of controls may include a steering wheel 115, an accelerator pedal 120, a brake pedal 125, etc. Although illustrated as a sedan, the vehicle 100 may include any passenger or commercial vehicle such as a car, a truck, a sport utility vehicle, a taxi, a bus, etc.

Figure 2:
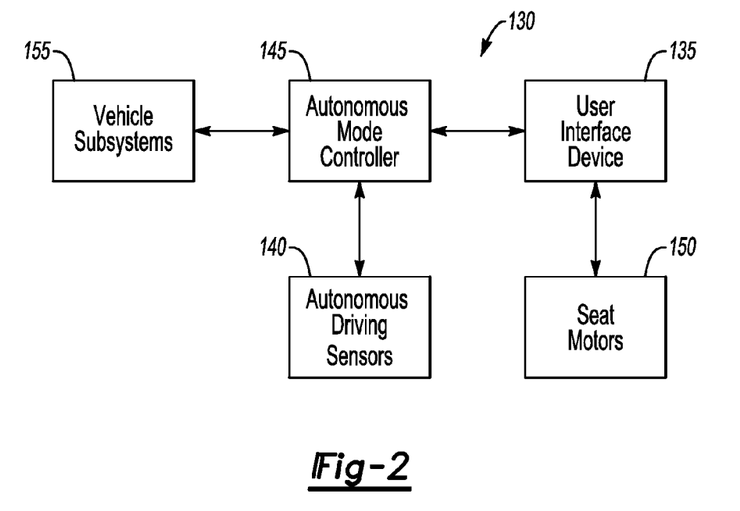
FIG. 2 is a block diagram of an exemplary system that may be used in the autonomous vehicle of FIG. 1.

FIG. 2 is a block diagram of an exemplary system 130 that may be used in the autonomous vehicle 100. As shown, the system 130 includes a user interface device 135, autonomous driving sensors 140, an autonomous mode controller 145, and a seat motor 150.

The user interface device 135 may be configured to present information to a user, such as a driver, during operation of the vehicle 100. Moreover, the user interface device 135 may be configured to receive user inputs. Thus, the user interface device 135 may be located in the passenger compartment 105 of the vehicle 100. In some possible approaches, the user interface device 135 may include a touch-sensitive display screen.

The autonomous driving sensors 140 may include any number of devices configured to generate signals that help navigate the vehicle 100 while the vehicle 100 is operating in an autonomous (e.g., driverless) mode. Examples of autonomous driving sensors 140 may include a radar sensor, a lidar sensor, a camera, or the like. The autonomous driving sensors 140 help the vehicle 100 "see" the roadway and the vehicle surroundings and/or negotiate various obstacles while the vehicle 100 is operating in the autonomous mode.

The autonomous mode controller 145 may be configured to control one or more subsystems 155 while the vehicle 100 is operating in the autonomous mode. Examples of subsystems 155 that may be controlled by the autonomous mode controller 145 may include a brake subsystem, a suspension subsystem, a steering subsystem, and a powertrain subsystem. The autonomous mode controller 145 may control any one or more of these subsystems 155 by outputting signals to control units associated with these subsystems 155. The autonomous mode controller 145 may control the subsystems 155 based, at least in part, on signals generated by the autonomous driving sensors 140.

The seat motors 150 may be configured to control the position and/or orientation of one or more seats 110 inside the passenger compartment 105. Each motor 150 may be associated with only one seat 110. Alternatively, a single motor 150 may be used to move multiple seats 110, including an entire row of seats 110. The motor 150 may operate in accordance with control signals output by the user interface device 135. For example, the user interface device 135 may receive commands from the driver or another passenger indicating a desire for one or more seats 110 to adopt a particular configuration. The motor 150 may automatically adjust the seats 110 to the desired configuration, including one or more predetermined configurations defined by a seat memory system. The motor 150 may be configured to apply one of the predetermined configurations based on the person in the seat 110. The seat occupant may be identified from, e.g., sensors located in the passenger compartment 105. If the seat occupant is unknown, the motor 150 may move the seat 110 to a default configuration. Examples of different possible seat 110 configurations are described in greater detail below. For example, the motor 150 may cause the seat 110 to pivot, fold, unfold, slide, recline, etc.

Figure 3A:
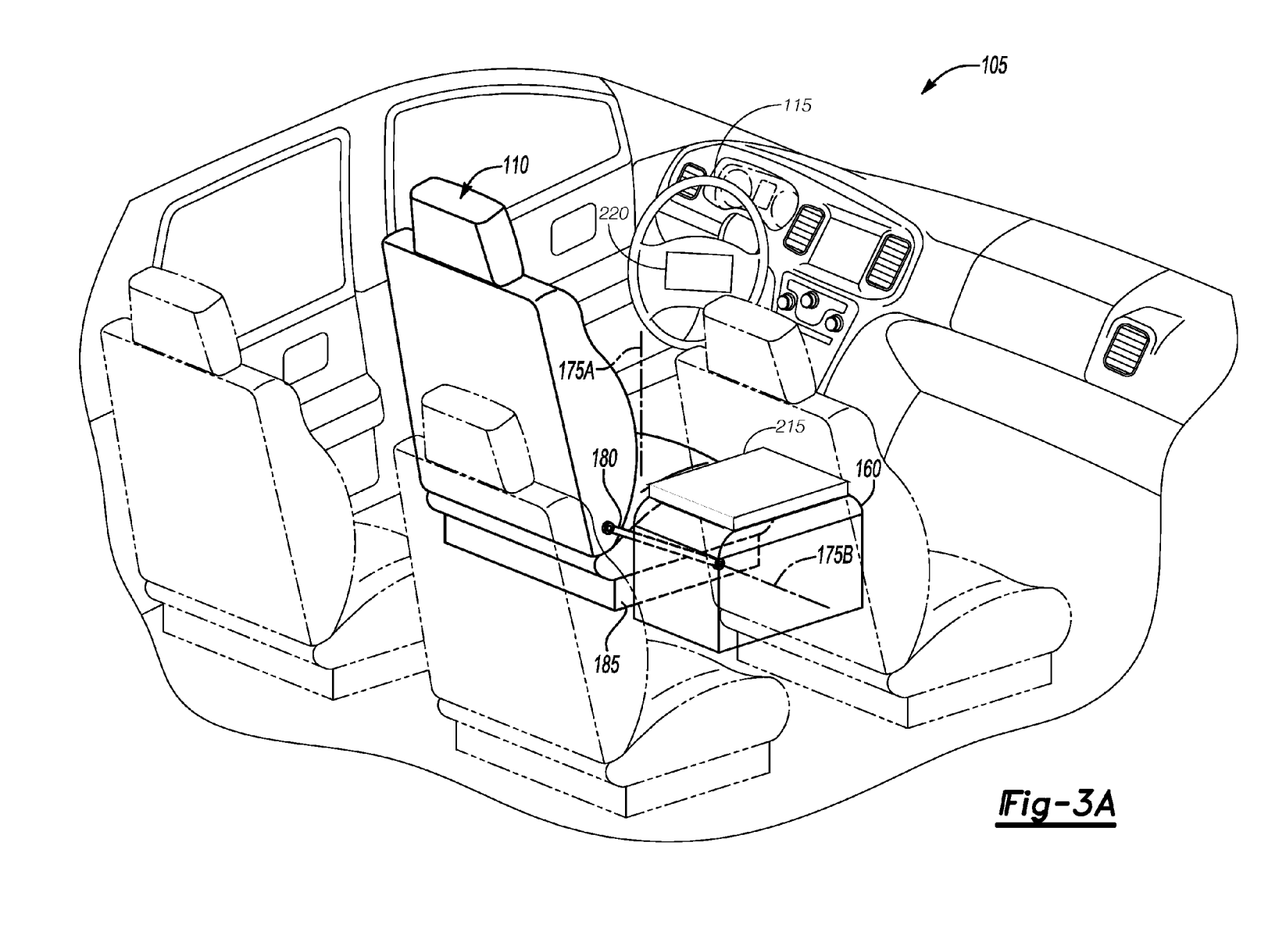
FIGS. 3A-3B illustrate one exemplary passenger compartment of an autonomous vehicle with reconfigurable interior.
Figure 3B:
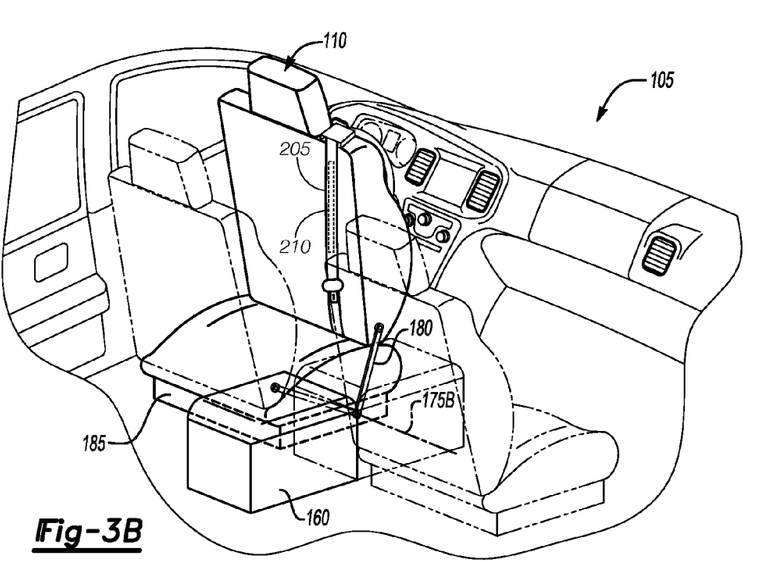

Referring now to FIGS. 3A-3B, the passenger compartment 105 includes a number of seats 110 and a center console 160. The seats 110 may include one or more bucket seats, captain's chairs, bench seats, split bench seats, or the like. Moreover, the seats 110 may be separated into rows, including a first row, a second row, and in some instances, a third row (see, e.g., FIG. 8). The first row may generally refer to the row closest to the front of the vehicle 100. One or more seats 110, such as the seats 110 in the first row, may be moved from a front-facing position to a rear-facing position while the vehicle is stationary or while the vehicle is moving to allow the passengers in the vehicle 100 to face one another when the vehicle 100 is operating in the autonomous mode.

One way to move the seats 110 from the front-facing position to the rear-facing position may be to rotate the seat 110. The seat 110 may be rotated about an axis 175A that extends generally perpendicularly from a floor of the vehicle 100 and through a center of the seat 110. Rotating the seat 110 may occur automatically when the vehicle 100 is operating in the autonomous mode or while the vehicle is parked. Moreover, the seat 110 may be rotated manually by, e.g., removing and repositioning the seat 110 or spinning the seat 110 about the axis 175A.

Figure 5:
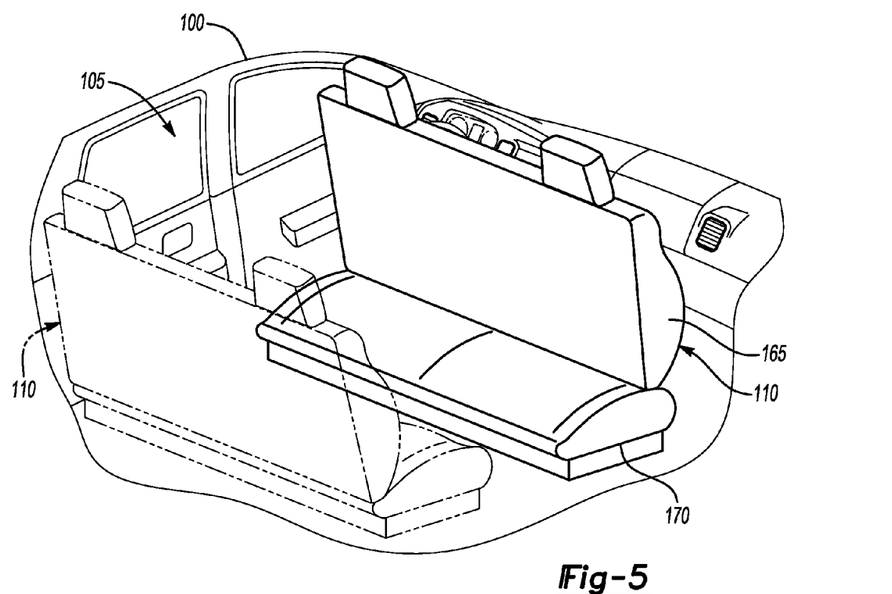
FIG. 5 illustrates a second exemplary passenger compartment of an autonomous vehicle with reconfigurable interior.

Alternatively, one part of the seat 110, such as a back portion 165 (FIG. 5), may pivot relative to another part of the seat 110, such as a bottom portion 170 (FIG. 5). FIGS. 3A-3B show how the back portion 165 may pivot relative to an axis 175B defined by the bottom portion 170. That is, the back portion 165 of the seat 110 may include one or more arms 180 that are pivotally attached to a frame 185 of the bottom portion 170. When the back portion 165 has been pivoted to a rear-facing position, the bottom portion 170 may become angled toward the front of the vehicle 100 as shown. The movement of the seat 110 from the front-facing position to the rear-facing position, and vice versa, may be actuated manually or by the motor 150 (not shown in FIGS. 3A-3B) when the vehicle 100 is stationary or operating in the autonomous mode. Different ways of reorienting the seats are described for illustrative purposes only. Other suitable ways to reorient the seats while the vehicle is stationary or moving in autonomous mode may alternatively be used.

As shown in FIG. 3B, a seatbelt 205 may be disposed on each seat 110 (shown only on the driver's seat for clarity), and the seatbelt 205 may be configured to move with the movement of the seat 110. Thus, the orientation of the seatbelt 205 may be fixed relative to the orientation of the seat 110. Moreover, the seatbelt 205 may be separate from other parts of the vehicle 100. Thus, the reorientation of the seat 110 is not hindered by the position of the seatbelt 205. In some possible approaches, the seatbelt 205 may include an inflator and a belt-integrated airbag 210. The belt-integrated airbag 210 may be deployed with one or more other airbags 190 (FIG. 4) in the event of a collision. The belt-integrated airbag 210 may be configured to deploy regardless of the orientation of the seat 110. In some implementations, however, the belt-integrated airbag 210 may be configured to deploy only when the seat 110 is facing, e.g., a rearward orientation. Thus, the inflator and belt-integrated airbag 210 in the seatbelt 205 may be disabled when the seat 110 is in a front-facing orientation.

A locking mechanism (not shown) may prevent the seat 110 from being moved to the rear-facing position, and vice versa. The locking mechanism may be manually unlocked by the user or automatically by, e.g., the motor 150 or another device. The original position of the seat 110 is shown in FIG. 3A, and FIG. 3B shows one of the seats 110 in a rearward position.

The console 160 located between the two front seats 110 may be configured to slide toward the front of the vehicle 100 when one or both seats 110 in the front row are in the rear-facing position. Alternatively, the console 160 may slide toward the back of the vehicle 100 to a position between the first and second rows of seats 110. This way, when one or more seats 110 in the first row are oriented in a rear-facing position, the center console 160 may act as a table available for passengers in either the first row and/or second row to use. The rearward movement of the central console 160 may also facilitate the reorientation of seats 110, which move between forward and rearward orientations by, e.g., rotational movements. In other words, the entire console 160 may move toward a center of the passenger compartment 105 to allow one or more of the seats 110 to change orientations. In some implementations, the console 160 may be configured to rotate. The console 160 may be moved by, e.g., lifting the console 160 about a hinge and either sliding or rotating the console 160 out of the path of the seats 110 or via a stepper motor. Therefore, the console 160 may be repositioned so as not to interfere with the reorientation of the seats 110 or a passenger's legs as the seats 110 are changing orientation. FIG. 3A shows the console 160 in its original position while FIG. 3B shows the console 160 moved away from the front of the vehicle 100.

The console 160 may include an integrated computing device 215, which may include a desktop computer, a laptop computer, a tablet computer, or the like. In FIG. 3A, the computing device 215 is shown as a laptop computer in a closed position. Operation of the computing device 215 may be limited to passengers in the passenger seat or the rear seats when the vehicle 100 is operating in manual mode. For example, the operation of the computing device 215 may be controlled by the relative orientation of the computing device 215 with respect to the vehicle 100. The computing device 215 may be attached such that selective rotational movement of the computing device 215 relative to the vehicle 100 may be allowed. When the vehicle 100 is operating in the autonomous mode, the computing device 215 may be available for all passengers. The computing device 215 may be integrated into the vehicle electrical system via, e.g., a docking station integrated into the console 160. Thus, in some instances, the computing device 215 may be removable from the console 160. The computing device 215 may be configured to implement one or more telecommunication protocols such as, but not limited to, Ethernet, Bluetooth®, or Wi-Fi. The computing device 215 may be tethered to the console 160 or another component in the passenger compartment 105 to, e.g., limit movement of the computing device 215 while the vehicle 100 is in operation.

Figure 4:
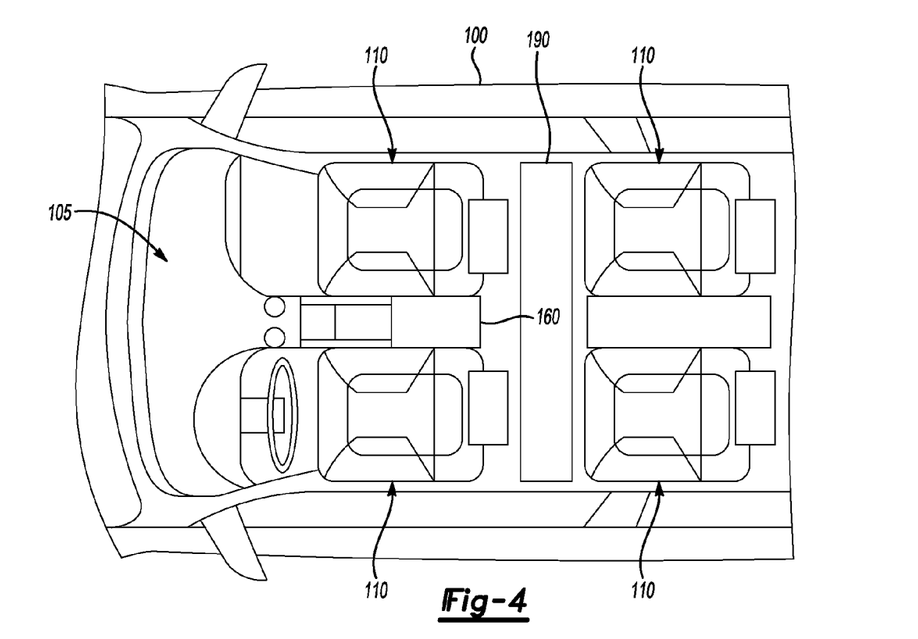
FIG. 4 illustrates an exemplary passenger compartment having an airbag located between rows of seats.

Referring now to FIG. 4, an airbag 190 may be located in the passenger compartment 105 between the first and second rows of seats 110. The airbag 190 may be deployed as a result of a collision while the vehicle 100 is operating in the autonomous mode and/or in a non-autonomous mode. The airbag 190 may be shaped such that a single airbag may be used for all passengers, including rear-facing passengers sitting in the first row and front-facing passengers sitting in the second row or multiple airbags may be used. Although the seats 110 shown in FIG. 4 are separate, the seats 110 may include bench seats or split bench seats that form an entire row, as shown in FIGS. 5 and 6.

Figure 6:
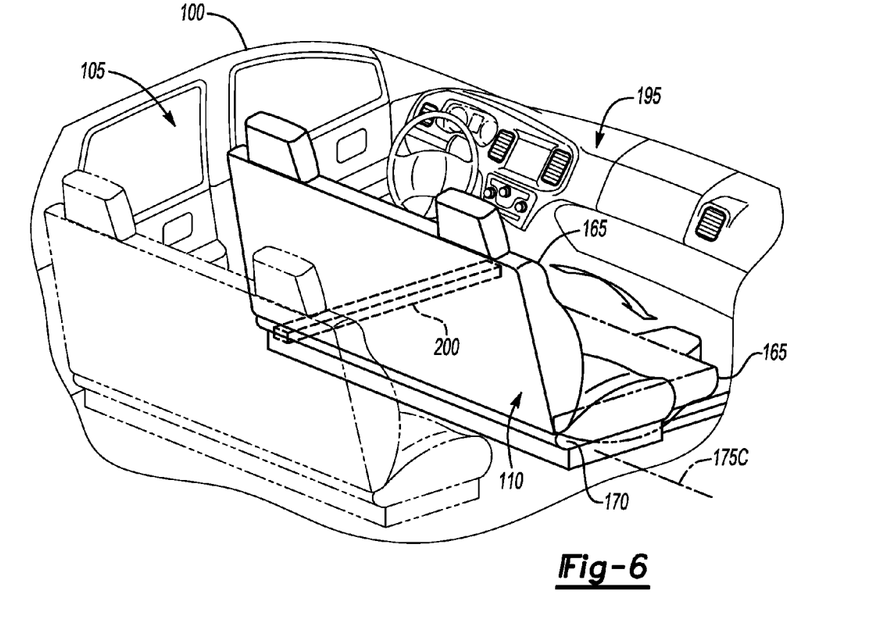
FIG. 6 illustrates a third exemplary passenger compartment of an autonomous vehicle with reconfigurable interior.

FIGS. 5 and 6 illustrate a passenger compartment 105 with two rows of bench seats 110. In FIG. 5, the first row is arranged in a rear-facing position and the second row is arranged in a front-facing position. Although not shown in FIG. 5, the front bench seat 110 may include arms 180 and a frame 185 similar to those shown in FIG. 3 for moving the front bench seat 110 into the rear-facing position. Therefore, the back portion 165 of the bench seat 110 may be configured to pivot about the axis 175B (see FIG. 3) defined by the bottom portion 170 to move into the rear-facing position. Pivoting the back portion 165 about the axis 175B and toward the front of the passenger compartment 105 may cause the bench seat 110 to be arranged in the rear-facing position while pivoting the back portion 165 about the axis 175B and away from the front of the passenger compartment 105 may cause the bench seat 110 to be arranged in the front-facing position (shown in solid line in FIG. 6). Moreover, the steering wheel 115 may be stowed by, e.g., moving the steering wheel 115 toward the instrument panel 195 to make room for the front seats 110 to move toward the instrument panel 195 to increase the leg room between the front and second row seats 110 when the front seats 110 are facing rearward. In some possible implementations, the steering wheel 115 may be foldable or collapsible to facilitate stowing the steering wheel 115 or to create more room for the seats 110 and/or the passengers while the vehicle 100 is operating in the autonomous mode (see FIG. 9).

Furthermore, the computing device 215, discussed above, may be implemented into the steering wheel 115 instead of the console 160 for when the vehicle 100 is operating in the autonomous mode (see FIG. 3A). The steering wheel 115 may, therefore, include a docking station for receiving the computing device 215. Alternatively, the computing device 215 may be implemented directly into the steering wheel 115, which may include incorporating, e.g., a touch-sensitive display screen 220 into the steering wheel 115.

Figure 7:
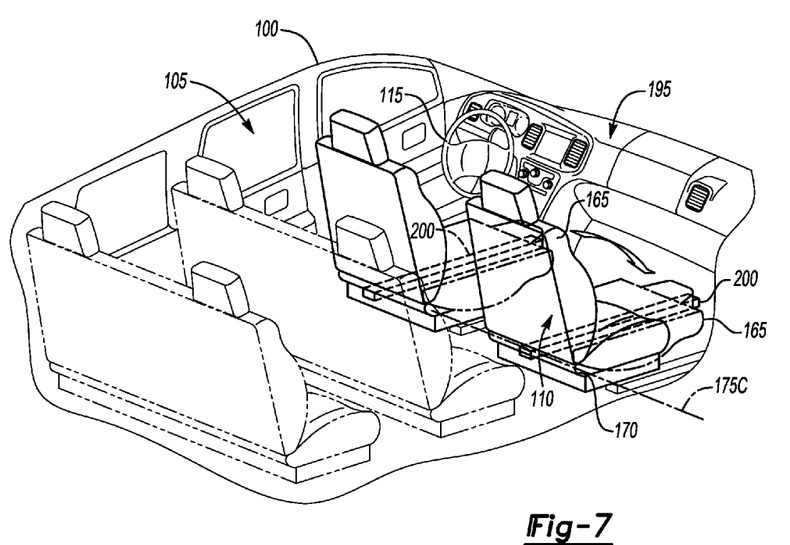
FIG. 7 illustrates a fourth exemplary passenger compartment of an autonomous vehicle with reconfigurable interior.
Figure 8:
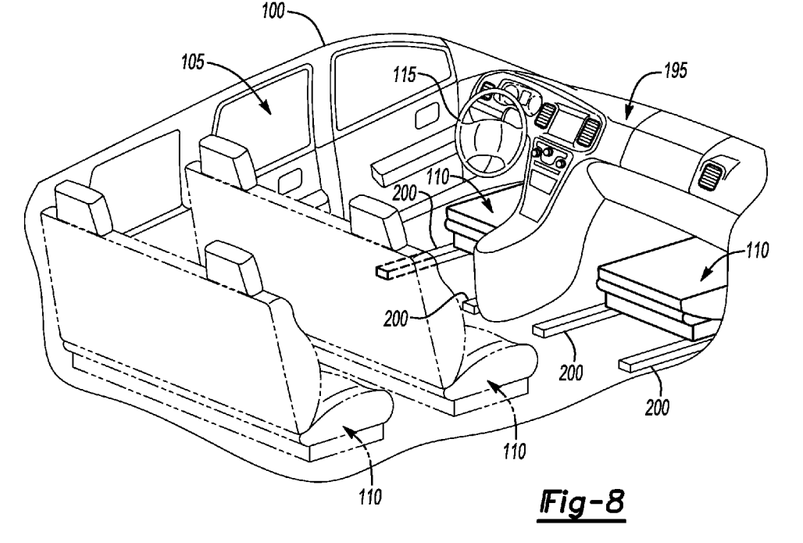
FIG. 8 illustrates a fifth exemplary passenger compartment of an autonomous vehicle with reconfigurable interior.

Alternatively, with reference to FIGS. 6-8, the front row seats 110 may be folded toward the front of the passenger compartment 105 about another axis 175C defined by the bottom portion 170 of each seat 110. The seats 110 may be folded and, e.g., stowed under the instrument panel 195, which may be located at the front of the passenger compartment 105. In one possible approach, the folded seats 110, including the driver seat and the front passenger seat, may slide along rails 200, located on the floor in the passenger compartment 105, toward an area underneath the instrument panel 195. FIG. 6 illustrates an example where the front row includes a bench seat 110 and FIGS. 7 and 8 illustrate examples where the front row includes adjacent bucket seats 110 (i.e., a driver seat and a front passenger seat). The motor 150 (see FIG. 2) may be used to fold the seats 110 and/or move the seats 110 to the location under the instrument panel 195. Moreover, the motor 150 may return one or more of the seats 110 to their original positions and/or orientations.

To accommodate the seats 110 under the instrument panel 195, one or more components located in the passenger compartment 105, such as the accelerator pedal 120 and the brake pedal 125 (see FIG. 1), may be moved further toward the front of the passenger compartment 105. Moreover, the steering wheel 115 may move to make room for the driver's seat 110 to slide under the instrument panel 195. The pedals 120, 125 may be deactivated when the vehicle 100 is operating in the autonomous mode and/or while the pedals 120, 125 are stowed to prevent inadvertent activation. The pedals 120, 125 may be reactivated when no longer stowed and/or when the vehicle 100 is no longer operating in the autonomous mode. In some possible approaches, another row of seats 110, such as the second row or third row (see FIG. 8), may move forward when the seats 110 in the first row are stowed under the instrument panel 195. Alternatively, or in addition, the third row may, e.g., recline so that the back portion 165 and bottom portion 170 are substantially aligned with one another.

Figure 9:
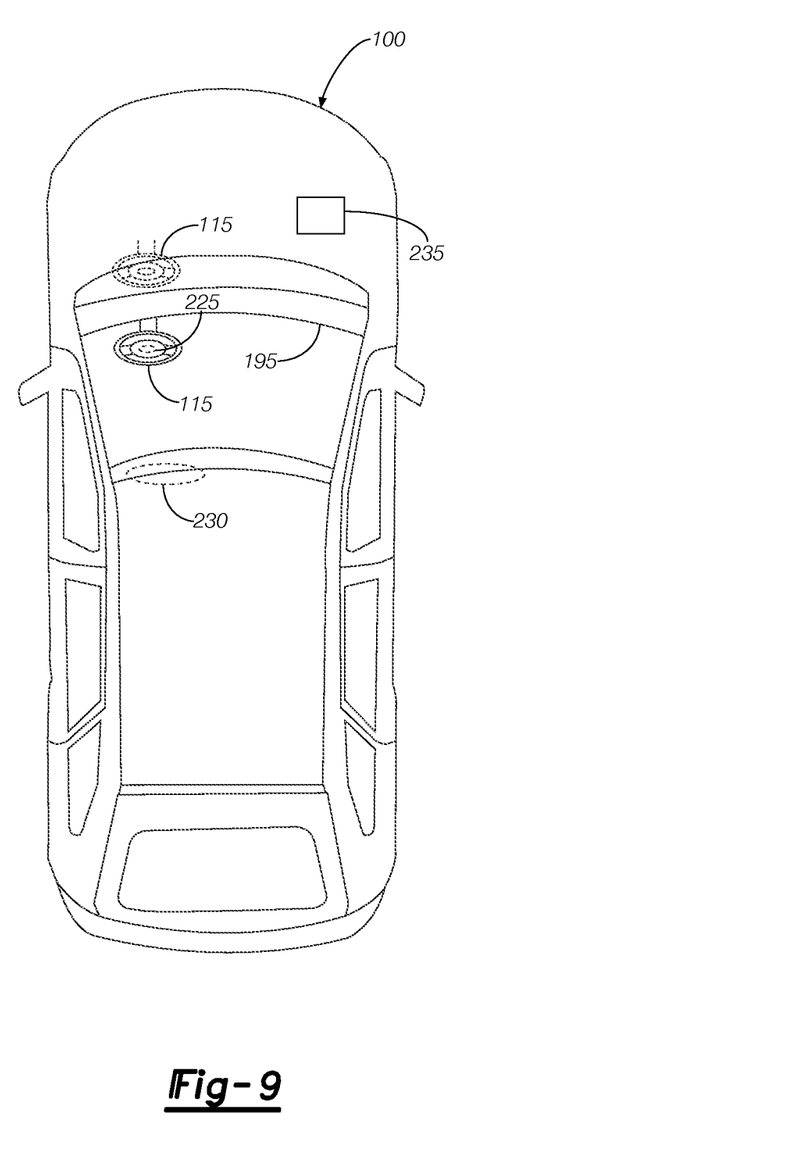
FIG. 9 is a top view of an exemplary vehicle having selectively enabled airbags.

FIG. 9 illustrates a top view of an exemplary vehicle 100 having a steering wheel 115 configured to move from an operational position (solid line) to a stowed position (shown in dashed line). The steering wheel 115 may be placed in the operational position any time it is necessary for operation of the vehicle 100, such when the vehicle 100 is operating in a non-autonomous or partially autonomous mode. The steering wheel 115 may be in the stowed position if the vehicle is operating in the autonomous mode. When in the stowed position, the steering wheel may be positioned under the instrument panel 195, giving a driver additional leg room or clearance to move the driver seat 110 to a rear-facing position. The steering wheel 115 may be configured to return to the operational position prior to the vehicle 100 operating in the non-autonomous mode or any partially autonomous mode that requires the driver to use the steering wheel 115.

A first airbag 225, which may be integrated into the steering wheel 115, may be configured to deploy during a collision that occurs while the steering wheel 115 is in the operational position. While the steering wheel 115 is in the stowed position, however, the first airbag 225 may be ineffective during a collision, even if the driver seat 110 is facing forward. Therefore, a second airbag 230, which may be located in a header above the windshield near the driver seat 110, may be deployed during a collision if the steering wheel 115 is in the stowed position.

A processing device 235, which may be incorporated into the autonomous controller, may be configured to selectively enable the first airbag 225 or the second airbag 230 based on, e.g., whether the steering wheel 115 is in the operational position or in the stowed position. When the steering wheel 115 is in the operational position, the processing device 235 may enable the first airbag 225 and disable the second airbag 230. Thus, in the event of a collision, the first airbag 225 will be deployed but the second airbag 230 will not. When the steering wheel 115 is in the stowed position, the processing device 235 may enable the second airbag 230 and disable the first airbag 225 so that only the second airbag 230 may be deployed in the event of a collision but the first airbag 225 will not.

The processing device 235 may further consider whether the driver seat 110 is facing forward or backward. If facing forward, the processing device 235 may enable either the first airbag 225 or the second airbag 230 according to the conditions previously discussed. If facing backward, the processing device 235 may disable both the first airbag 225 and the second airbag 230.

In general, computing systems and/or devices, such as the user interface device 135, the autonomous mode controller 145, and the processing device 235, may employ any of a number of computer operating systems, including, but by no means limited to, versions and/or varieties of the Ford SYNC® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., and the Android operating system developed by the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
    a passenger compartment;
    a steering wheel located in the passenger compartment and configured to be moved from an operational position to a stowed position,
    a first airbag configured to deploy during a collision if the steering wheel is in the operational position; and
    a second airbag configured to deploy during the collision if the steering wheel is in the stowed position.

2. The vehicle of claim 1, wherein the first airbag is integrated into the steering wheel.

3. The vehicle of claim 1, wherein the second airbag is incorporated into a header.

4. The vehicle of claim 1, further comprising a processing device configured to selectively enable one of the first airbag and the second airbag based on whether the steering wheel is in one of the operational position and the stowed position and a driver seat is facing a vehicle forward direction.

5. The vehicle of claim 1, further comprising a processing device configured to disable the first airbag and the second airbag when a driver seat is facing backward and the vehicle is operating in an autonomous mode.

6. The vehicle of claim 1, further comprising an instrument panel, and wherein the steering wheel is configured to be stowed under the instrument panel when the steering wheel is in the stowed position.

7. The vehicle of claim 1, wherein the first airbag is disabled while the steering wheel is in the stowed position.

8. The vehicle of claim 1, wherein the second airbag is disabled while the steering wheel is in the operational position.

9. The vehicle of claim 1, wherein the steering wheel is configured to be moved to the stowed position when the vehicle is operating in an autonomous mode.

10. The vehicle of claim 9, wherein the steering wheel is configured to be moved from the stowed position to the operational position prior to the vehicle operating in a non-autonomous mode.

11. A vehicle comprising:
    autonomous driving sensors;
    an autonomous controller configured to receive signals generated by the autonomous driving sensors and control at least one vehicle subsystems according to the signals;
    a passenger compartment; and
    a steering wheel located in the passenger compartment and configured to be moved from an operational position to a stowed position,
    a first airbag configured to deploy during a collision if the steering wheel is in the operational position; and
    a second airbag configured to deploy during the collision if the steering wheel is in the stowed position.

12. The vehicle of claim 11, wherein the first airbag is integrated into the steering wheel.

13. The vehicle of claim 11, wherein the second airbag is incorporated into a header.

14. The vehicle of claim 11, further comprising a processing device configured to selectively enable one of the first airbag and the second airbag based on whether the steering wheel is in one of the operational position and the stowed position.

15. The vehicle of claim 14, wherein the processing device is incorporated into the autonomous controller.

16. The vehicle of claim 11, further comprising an instrument panel, and wherein the steering wheel is configured to be stowed under the instrument panel when the steering wheel is in the stowed position.

17. The vehicle of claim 11, wherein the first airbag is disabled while the steering wheel is in the stowed position and wherein the second airbag is disabled while the steering wheel is in the operational position.

18. The vehicle of claim 11, further comprising a processing device configured to disable the first airbag and the second airbag when a driver seat is facing backward and the vehicle is operating in an autonomous mode.

19. The vehicle of claim 11, wherein the steering wheel is configured to be moved to the stowed position when the vehicle is operating in an autonomous mode and from the stowed position to the operational position prior to the vehicle operating in a non-autonomous mode.

20. A vehicle comprising:
    autonomous driving sensors;
    an autonomous controller configured to receive signals generated by the autonomous driving sensors and control at least one vehicle subsystems according to the signals;
    a passenger compartment;
    a steering wheel located in the passenger compartment and configured to be moved from an operational position to a stowed position,
    a first airbag incorporated into the steering wheel and configured to deploy during a collision if the steering wheel is in the operational position;
    a second airbag incorporated into a header and configured to deploy during the collision if the steering wheel is in the stowed position; and
    a processing device configured to selectively enable one of the first airbag and the second airbag based on whether the steering wheel is in one of the operational position and the stowed position.

* * * * *